US006944191B2

(12) United States Patent
Hou et al.

(10) Patent No.: US 6,944,191 B2
(45) Date of Patent: Sep. 13, 2005

(54) METHOD OF OPTIMIZING EQUIPMENT UTILIZATION IN TELECOMMUNICATION ACCESS NETWORK

(75) Inventors: Hao Hou, Plano, TX (US); Na Li, Plano, TX (US); San-qi Li, Plano, TX (US); Thomas A. Cain, Plano, TX (US)

(73) Assignee: Santera Systems, Inc., Plano, TX (US)

( * ) Notice: Subject to any disclaimer, the term of this patent is extended or adjusted under 35 U.S.C. 154(b) by 976 days.

(21) Appl. No.: 09/746,395

(22) Filed: Dec. 21, 2000

(65) Prior Publication Data

US 2002/0080955 A1 Jun. 27, 2002

(51) Int. Cl.⁷ .............................. H04J 3/04; H04J 3/26; H04L 12/28
(52) U.S. Cl. .................... 370/535; 370/395.1; 370/410; 370/432
(58) Field of Search .............................. 370/395.1, 400, 370/410, 432, 535, 426, 536, 537, 395.6, 395.61, 395.64, 351, 352–358, 389, 394, 395.2, 395.52, 395.56, 466, 496; 379/1.01, 1.04, 27.04, 93.01, 93.09, 138, 207.04–210.02

(56) References Cited

U.S. PATENT DOCUMENTS

| | | | | |
|---|---|---|---|---|
| 3,917,908 A | * | 11/1975 | Galluccio | 379/136 |
| 4,421,952 A | * | 12/1983 | Barnes | 455/463 |
| 4,480,330 A | * | 10/1984 | Magnusson et al. | 370/370 |
| 5,933,491 A | | 8/1999 | Miller et al. | |
| 6,640,239 B1 | * | 10/2003 | Gidwani | 709/203 |
| 6,731,627 B1 | * | 5/2004 | Gupta et al. | 370/352 |
| 6,798,744 B1 | * | 9/2004 | Loewen et al. | 370/235 |

FOREIGN PATENT DOCUMENTS

| | | |
|---|---|---|
| WO | WO 00/39994 A1 | 7/2000 |
| WO | WO 00/44191 A1 | 7/2000 |

OTHER PUBLICATIONS

M. Verhoeyen, "Delivering Voice Services Over DSL," Alcatel Telecommunications Review, p. 244–249, (Oct. 1, 2000).
World Wide Web, http://www.iec.org/tutorials/voice_dsl, "Voice Over Digital Subscriber Line (VoDSL) Tutorial," The International Engineering Consortium, 22 pages, (printed on Jun. 7, 2001).
Technical Report, "Requirements for Voice Over DSL," DSL Forum TR–036, Version 1.0, Aug. 28, 2000, 41 pages.
The ATM Forum, "Voice and Multimedia Over ATM–Loop Emulation Service Using AAL2," Technical Committee, AF–VMOA–0145.000, Jul., 2000, 84 pages.

* cited by examiner

Primary Examiner—Hanh Nguyen
(74) Attorney, Agent, or Firm—Haynes and Boone, LLP

(57) ABSTRACT

A method of optimizing access network utilization is provided. The access network includes a plurality of integrated access devices coupled to a segment and reassembly device, where each segment and reassembly device has a plurality of channels, X. The method includes the steps of providing a plurality of subscriber lines, $\Sigma m_i$, coupled to the integrated access devices, providing a plurality of integrated access device lines, $\Sigma n_i$, between the integrated access devices and the segment and reassembly device, multiplexing the plurality of subscriber lines by the integrated access device onto the plurality of integrated access device lines, such that $\Sigma m_i > \Sigma n_i = X$, and providing a reorder tone to any subscriber whose call is blocked.

44 Claims, 2 Drawing Sheets

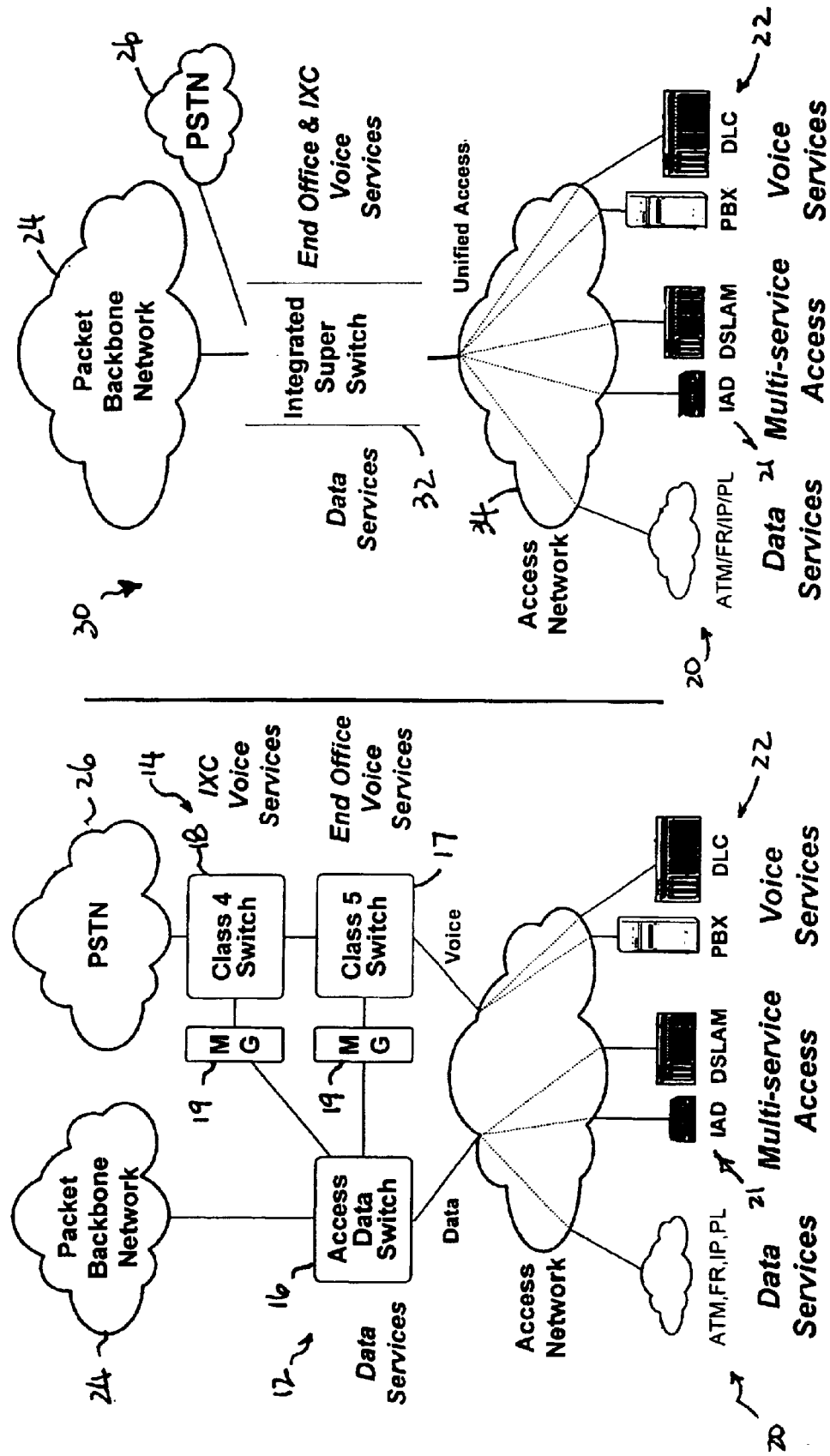

METHOD OF OPTIMIZING EQUIPMENT UTILIZATION IN TELECOMMUNICATION ACCESS NETWORK

TECHNICAL FIELD OF THE INVENTION

This invention relates to telecommunication equipment and network, and more particularly, to a method of optimizing equipment utilization in telecommunication access network.

BACKGROUND OF THE INVENTION

A major effort within the telecommunication industry is to merge the currently disparate voice and data communication networks. Voice networks, having evolved from analog to digital, have traditionally been implemented as circuit switched systems while data networks have evolved as packet switched systems. These voice circuit switched systems tend to severely under-utilize bandwidth. Studies indicate that approximately 20% of the available bandwidth is actually utilized for a circuit switched voice telephone call. This ineffective bandwidth use is driving the industry to move voice call processing from the circuit switched network to a packet switched network. Packet switching and transmission efficiently converges voice and data onto a single network.

Telecommunications networks typically evolve from the core outward. Network cores are quickly moving from circuit switched to packet switched systems and now the edge of the network is evolving also. The trend in integrated voice and data network access is voice over digital subscriber line (VoDSL). Voice as well as data is carried over these access lines via asynchronous transfer mode (ATM) and/or Internet protocol (IP). Currently, most network operators utilize a transition network, as shown in FIG. 1, to merge digital subscriber line (DSL) subscriber service into their current networks. DSL provides unified voice and data access (data services 20, multi-service access 21, and voice services 22) at the subscriber end of the line, but transition networks must disassociate the voice and data streams for independent processing. Prior to actual processing, the voice and data streams are split onto a data network 12 and a traditional time division multiplexed (TDM) voice network 14. Data network 12 includes an access data switch 16, and voice network 14 includes class 5 and class 4 switches 17 and 18 and media gateways 19. The digital data are then transmitted to and from a packet backbone network 24, and the voice data are transmitted to and from a public switched telephone network (PSTN) 26. Due to the necessity of accommodating these transition networks, the DSL access equipment must conform to the requirements of both the packet switched and TDM circuit switched networks to which it connects. This 'least common denominator' approach does not effectively utilize available resources, particularly in the narrowband voice call area.

SUMMARY OF THE INVENTION

Therefore, it is desirable to arrive at an efficient system design which enables direct ATM termination of the DSL access system to better utilize bandwidth and AAL2 channel capacity. This invention is fully compliant with the ATM Forum industry standard for Voice over ATM, AF-VMOA-0145.000, "Voice and Multimedia Over ATM—Loop Emulation Service Using AAL2".

In accordance with an embodiment of the present invention, a method of optimizing access network utilization is provided. The access network includes a plurality of integrated access devices coupled to a segment and reassembly device, where each segment and reassembly device has a plurality of channels, X. The method includes the steps of providing a plurality of subscriber lines, $\Sigma m_i$, coupled to the integrated access device, providing a plurality of integrated access device lines, $\Sigma n_i$, between the integrated access devices and the segment and reassembly device, multiplexing the plurality of subscriber lines by the integrated access device onto the plurality of integrated access device lines, such that $\Sigma m_i > \Sigma n_i$ and $\Sigma n_i = X$, and providing a reorder tone to any subscriber whose call is blocked.

In accordance with another embodiment of the present invention, a method of optimizing access network utilization is provided. The access network includes a plurality of integrated access devices coupled to a segment and reassembly device each having a plurality of channels, X. The method includes the steps of providing a plurality of subscriber lines, $\Sigma m_i$, coupled to the integrated access device, providing a plurality of integrated access device lines, $\Sigma n_i$, between the integrated access devices and the segment and reassembly device, multiplexing the plurality of integrated access device lines onto the plurality of channels, such that $\Sigma m_i = \Sigma n_i$ and $\Sigma n_i > X$, and providing a reorder tone to any subscriber whose call is blocked.

In accordance with yet another embodiment of the present invention, a method of optimizing access network utilization is provided. The access network includes a plurality of access devices coupled to a VoDSL device each having a plurality of channels, X. The method includes the steps of providing a plurality of subscriber lines, $\Sigma m_i$, coupled to the access devices, providing a plurality of access lines, $\Sigma n_i$, between the access devices and the VoDSL device, multiplexing the plurality of access lines onto the plurality of channels X, such that $\Sigma m_i = \Sigma n_i$ and $\Sigma n_i > X$, providing a reorder tone to any subscriber whose call is blocked.

A technical advantage of the present invention is the efficient design and utilization of bandwidth and AAL2 channel capacity in the ATM access network.

BRIEF DESCRIPTION OF THE DRAWINGS

For a more complete understanding of the present invention, the objects and advantages thereof, reference is now made to the following descriptions taken in connection with the accompanying drawings in which:

FIG. 1 is a simplified block diagram of a typical transition telecommunication network;

FIG. 2 is a simplified block diagram of a telecommunication network with an integrated next generation switch using the optimization method of the present invention.

DETAILED DESCRIPTION OF THE DRAWINGS

Figure 3:
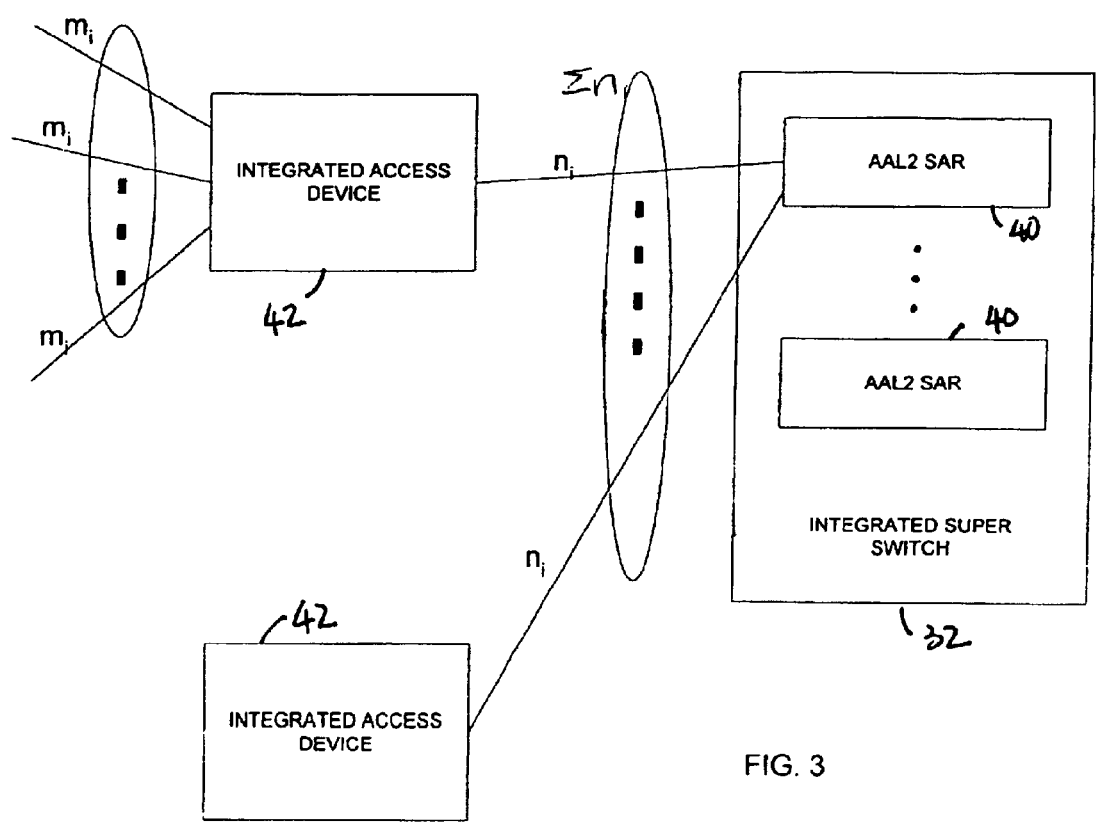
FIG. 3 is simplified block diagram for illustrating line concentration in the ATM adaptation layer type 2 (AAL2) segment and reassembly (SAR) chips in the integrated next generation switch and the integrated access devices according to the teachings of the present invention.

The preferred embodiment of the present invention and its advantages are best understood by referring to FIGS. 1 through 3 of the drawings, like numerals being used for like and corresponding parts of the various drawings.

FIG. 1 is a simplified block diagram of a typical transitional telecommunication network, which is described and discussed above. Typically, the bandwidth available between the digital loop carrier (DLC) and the host system is much less than the bandwidth required if all subscriber interfaces on the digital loop carrier attempted to get service simultaneously. Because it is an extremely rare event that all subscribers request service simultaneously, the users are statistically multiplexed onto the available digital loop carrier. This is commonly known as "concentration" or "oversubscription". Under normal circumstances, this arrangement is an effective and economical one for both the subscriber and the network operator. Telcordia, formerly Bellcore, published a standard for digital loop carrier systems entitled "Integrated Digital Loop Carrier, System Generic Requirements, Objectives, and Interface", document number GR-303-CORE. This document provides an explicit interface protocol for all external access equipment to connect to an existing legacy switching system. In the event of blockage due to lack of available bandwidth, GR-303 states that the subscriber must be given a reorder tone, often referred to as "fast busy." In an analog digital loop carrier, this is a relatively simple matter to broadcast reorder tone onto a digital loop carrier time division multiplex (TDM) bus which can be accessed directly by all subscriber lines in the digital loop carrier. A problem arises, though, when this same interface is utilized by a digital subscriber line (DSL) access system for voice over digital subscriber line (VoDSL) applications.

Voice over DSL is typically transported via asynchronous transfer mode (ATM) from the customer premises equipment (CPE) to the digital subscriber line access system. Asynchronous transfer mode utilizes various priority and coding schemes for transport of different types of data. Voice is typically handled via ATM adaptation layer type 2 (AAL2) for variable bit rate and delay sensitive information. AAL2 is typically implemented in hardware utilizing application specific circuitry. Each customer premises equipment component which supports AAL2 must include this hardware. At the digital subscriber loop access end of the subscriber loop, AAL2 hardware is also required, with one AAL2 channel for each engineered voice circuit. In order to meet the GR-303 requirements necessary for integration with legacy switching equipment, the remote digital terminal (RDT) must be able to provide reorder tone to all subscribers simultaneously. To meet this requirement, the digital subscriber loop access system must support a number of AAL2 channels equal to the number of voice subscriber appearances. This is an extremely ineffective use of expensive hardware. While oversubscription of the digital subscriber loop access to host bandwidth can be utilized, oversubscription of the AAL2 hardware cannot. This means that any digital subscriber loop access system which is hosted by a transition network must be over-equipped with AAL2 hardware. The additional AAL2 hardware is likely never to be effectively utilized to support revenue traffic.

FIG. 2 is a simplified block diagram of a telecommunication network 30 with an integrated next generation switch 32 using the optimization method of the present invention. Unlike the typical transitional network where voice and data streams are separated in the access network, telecommunication network 30 includes a unified access network 34. The use of integrated next generation switch 32 obviates the need for an access or media gateway and its GR-303 interface. Therefore, the entire system may be efficiently engineered, including the access network bandwidth and AAL2 channel capacity for real traffic requirements.

FIG. 3 is simplified block diagram for illustrating line concentration in the segment and reassembly (SAR) chips 40 in integrated next generation switch 32 and the integrated access devices (IAD) 42 according to the teachings of the present invention. In FIG. 3, $m_i$ is the maximum number of subscriber lines per integrated access device, $\Sigma m_i$ is the maximum number of subscriber lines of all the integrated access devices 42 combined for each segment and reassembly chip 40, $n_i$ is the maximum number of trunk-side lines per integrated access device 42, and $\Sigma n_i$ is the maximum number of trunk-side lines per segment and reassembly chip 40. The assumptions used include 1% call blocking probability, 10% usage per line, and the probability of not providing reorder tone when needed being less than $10^{31\ 9}$. These are common values used within the telecommunications network, but each may be adjusted per the traffic engineering requirements of any particular network implementation. For the discussion below, assume that each segment and reassembly chip 40 provides X=1023 channels.

The first configuration involves no line concentration, where $\Sigma m_i=\Sigma n_i=X$ or 1023 lines. This is the most common configuration in the network today and is discussed herein only for completeness. There is no network optimization to be gained here and is wasteful in resource utilization in an actual network deployment.

The second configuration optimizes the line usage by making $\Sigma m_i>\Sigma n_i$ and $\Sigma n_i=X$ or 1023 lines, where there is concentration at the integrated access device. This implementation requires that the integrated access device provide reorder tone to the subscriber when calls are blocked, which is now possible. This is a viable configuration, but there is no standard VoDSL protocol to support it. Any vendor implementing this solution must do so in a proprietary manner. Vendor proprietary solutions are not popular in today's network, so this solution is less than optimal from the network operator's point of view. Instead of providing blocked call treatment at the IAD, we can provide it from the switch and still support oversubscription of the AAL2 channels.

The number of served lines is driven by the size of the integrated access device. The larger the integrated access device, the more efficiently it can utilize the available AAL2 channels. The analysis process for examining circuit queuing requirements in the telecommunication network was developed by Professor A. K. Erlang at the University of Copenhagen in the 1920s. Erlang's principles are proven, sound, and still the standard for queuing analysis today. The Erlang-B function is commonly used to calculate the unknown variable when provided the other two of: blockage, offered load, and number of circuits. An Erlang is defined as the ratio of arrival rate over processing rate. Therefore, twenty calls per hour with a processing time of three minutes per call (or twenty calls per hour) equals one Erlang; one Erlang equals one circuit fully utilized for one hour. For example, if blockage is 0.01, and the number of circuits is 32, the Erlang-B calculation provides that 22.05 Erlangs of traffic may be supported. To get back to a full AAL2 chip worth of supported lines, 22.05 Erlangs per IAD*1023 AAL2 channels/32 IADs=704.9 Erlangs. With the assumption that each line is used 10% of the time, this results in 7049 lines. 7049 lines is a significant improvement over the number of lines that can be supported in the first configuration. Therefore, $\Sigma m_i=7049$ and $\Sigma n_1=1023$ in this example.

A third configuration involves concentration at both the integrated access device and switch, such that $\Sigma m_i>\Sigma n_i>1023$ lines. In this arrangement, we have $\Sigma m_i$ equal to the number of supported subscribers, $\Sigma n_i$ equal to the number of circuits on the integrated access device trunk side, and 1023 equal to the number of simultaneous calls supported at the switch. When blockage occurs at the switch, the switch must provide reorder tone. Some number of AAL2 channels need to be used to provide reorder tone out of the switch. These reserved channels will not be used for revenue traffic. A determination is made as to how many channels must be reserved in order to continue providing the expected grade of service over the set of served lines, such as 1% blocking. For example, 0.8% blockage is allocated to the integrated access device and 0.2% allocated to the switch to meet the 1% total blockage goal. An assumption is also made such that each blocked subscriber will retry two additional times to place a call, and that the average holding time on reorder is three seconds.

In this implementation, the system blockage is divided between the integrated access devices and the switch. Allocating 20% of the total system blocking probability of 0.01 to the switch gives a probability of blocking at the AAL2 device of 0.002. Erlang-B shows that 1023 circuits at 0.002 blocking probability can support 962.56 Erlangs of traffic. The blocked traffic equates to 0.002*962.56=1.925 Erlangs. Because average holding time on reorder is 3 seconds versus 180 seconds for a normal call, we divide 1.925/60=0.032 Erlang. Due to our assumption of 5 tries each time a user is blocked from normal call completion, 0.032 Erlang*5=0.16 Erlang of blockage traffic to manage. Applying Erlang-B once again, 0.16 Erlang at $10^{-9}$ probability of blocking requires 7 AAL2 circuits. Repeating these calculations once again with 1023−7=1016 revenue AAL2 channels confirms 955.72 Erlangs of revenue traffic. At 10% usage per line, this configuration supports a maximum of 9557 subscriber lines, $m_i$, regardless how large $n_i$ grows as long as it is at least>1023; the number of total AAL2 channels.

The next configuration is a simplification of the previous configuration. In the previous two configurations, the integrated access device would provide reorder tone for the calls it blocks. While useful for examining all possible solutions to the problem, it is not necessarily a practical solution because no integrated access device standards exist and no known products on the market support this environment. So, to converge on a solution that is both efficient and implemented with readily available products, the configuration where $\Sigma m_i = \Sigma n_i$ and $\Sigma n_i > 1023$ lines is studied.

With all blockage at the switch, we must identify the traffic quantity blocked by the planned 0.01 blocking probability and the necessary number of AAL2 reorder channels to handle this blocked traffic. To start, 1023 AAL2 channels at 0.01 probability of blocking equates to 994.15 Erlangs of traffic. One percent of this number is where we start to find blocked traffic to manage; 9.994 Erlangs. This number is divided by 60 due to the 3 second holding time on blockage tone versus 180 seconds holding time for a normal call. It is assumed that the user will retry 4 additional times which, for this calculation, we assume all fail. So, to arrive at the required amount of blockage traffic to be managed, 9.994 Erlangs divided by 60 times 5 attempts equals 0.833 Erlang reorder tone traffic. Erlang-B then indicates 12 AAL2 reorder circuits are required. Now repeat these calculations based on 1023−12=1011 AAL2 revenue channels at 0.01 probability of blocking. This reduces the overall traffic capability slightly from our initial estimate to 982.18 Erlangs. Rerunning the Erlang calculations confirm that 12 AAL2 reorder channels will support the blocked revenue traffic with 4 additional retries at a probability of being blocked from the reorder tone at less than $10^{-9}$. Applying this to 10% usage lines, this implementation provides 982.18 Erlangs/10%=9821 lines per 1023 channel AAL2 device served ($m_i=n_i=9821$ lines). This implementation both meets the GR-303 error processing requirements, well exceeds the overall system availability of 99.999%, and is a significant increase over the 1023 supported lines in the non-oversubscribed base model. In real world situations, network operators may choose to engineer different grades of service and choose to alter the probability of blocking by manipulating $n_1$ on any particular integrated access device installation. These kinds of engineering changes are supported by the present invention and reevaluation of the traffic characteristics will enable the network operator to optimize the engineering for his/her own particular network and customers.

Applicable standards include the North American GR-303 integrated digital terminal (IDT) interface, the ETSI specifications for local exchange/access network functionality known as V5.1 and V5.2 are analogous to GR-303. The methods of the present invention as described herein such as dedicated channels for sourcing inband call progress error tones, apply to all voice over data network implementations where shared channelized endpoint circuitry is utilized. The present invention provides for concentration at the integrated access device, at the switch, or at both the switch and integrated access device.

While the invention has been particularly shown and described by the foregoing detailed description, it will be understood by those skilled in the art that various changes, alterations, modifications, mutations and derivations in form and detail may be made without departing from the spirit and scope of the invention.

What is claimed is:

1. A method, comprising:
   employing a plurality of integrated access devices to multiplex a plurality of packetized signals from ones of a plurality of network terminals onto ones of a plurality of channels of a network switch component, wherein:
   the plurality of network terminals is greater than the plurality of channels of the network switch component; and
   the plurality of integrated access devices are connected to the network switch component by a plurality of integrated access devices lines that is not less than the plurality of channels of the network switch component.

2. The method of claim 1 wherein:
   each of a plurality of subscriber lines couples one of the plurality of network terminals and a corresponding one of the plurality of integrated access devices;
   each of the plurality of integrated access device lines couples one of the plurality of channels of the network switch component and a corresponding one of the plurality of integrated access devices; and
   employing the plurality of integrated access devices to multiplex the plurality of packetized signals includes multiplexing the plurality of packetized signals from ones of the plurality of subscriber lines onto ones of the plurality of integrated access device lines.

3. The method of claim 1 wherein the network switch component is a segment and reassembly (SAR) device.

4. The method of claim 1 wherein the network switch component is a voice over digital subscriber line (VoDSL) device.

5. The method of claim 1 wherein the network switch component is an ATM adaptation layer type 2 (AAL2) device.

6. The method of claim 1 wherein:
   the network switch component is one of a plurality of network switch components;

the plurality of channels includes channels of each of the plurality of network switch components, collectively;

the plurality of network terminals is greater than the plurality of channels of all of the plurality of network switch components, collectively; and the plurality of integrated access device lines is not less than the plurality of channels of all of the plurality of network switch components, collectively.

7. The method of claim 1 wherein:

the plurality of network terminals is greater than the plurality of integrated access device lines; and the plurality of integrated access device lines is greater than the plurality of channels of the network switch component.

8. The method of claim 1 wherein:

the plurality of network terminals is greater than the plurality of integrated access device lines; and the plurality of integrated access device lines is equal to the plurality of channels of the network switch component.

9. The method of claim 1 wherein:

the plurality of network terminals is equal to the plurality of integrated access device lines; and the plurality of integrated access device lines is greater than the plurality of channels of the network switch component.

10. The method of claim 1 wherein the packetized signals include voice over digital subscriber line signals.

11. The method of claim 1 further comprising providing information to any of the plurality of network terminals for which network access is blocked, including information indicating that network access is blocked.

12. The method of claim 1 further comprising providing a busy signal to any of the plurality of network terminals for which network access is blocked.

13. The method of claim 1 further comprising providing a reorder tone to any of the plurality of network terminals for which network access is blocked.

14. The method of claim 1 further comprising providing information to any of the plurality of network terminals for which network access is blocked, including information indicating that network access is blocked, wherein the information is broadcasted by at least the network switch component.

15. The method of claim 1 further comprising providing information to any of the plurality of network terminals for which network access is blocked, including information indicating that network access is blocked, wherein the information is not broadcasted by the network switch component.

16. The method of claim 1 further comprising providing information to any of the plurality of network terminals for which network access is blocked, including information indicating that network access is blocked, wherein:

the plurality of channels of the network switch component includes a plurality of revenue traffic channels and a plurality of reserved channels not otherwise employed for revenue traffic;

the information is broadcasted by the plurality of reserved channels; and the plurality of integrated access device lines is not less than the plurality of revenue traffic channels.

17. The method of claim 1 further comprising providing information to any of the plurality of network terminals for which network access is blocked, including information indicating that network access is blocked, wherein:

the plurality of channels of the network switch component includes a plurality of revenue traffic channels and a plurality of reserved channels not otherwise employed for revenue traffic;

the information is broadcasted by the plurality of reserved channels and is not broadcasted by any of the plurality of integrated access devices; and the plurality of integrated access device lines is not less than the plurality of revenue traffic channels.

18. The method of claim 1 wherein any one of the plurality of packetized signals simultaneously includes voice data and non-voice data.

19. The method of claim 1 wherein the plurality of network terminals is oversubscribed relative to the plurality of integrated access device lines.

20. The method of claim 1 wherein the plurality of network terminals is oversubscribed relative to the plurality of channels of the network switch component.

21. An apparatus, comprising:

means for multiplexing a plurality of packetized signals from ones of a plurality of network terminals onto ones of a plurality of channels of a network switch component, wherein:

the plurality of network terminals is greater than the plurality of channels of the network switch component;

the multiplexing means includes at least one of a plurality of integrated access devices; and the plurality of integrated access devices are connected to the plurality of channels of the network switch component by a plurality of integrated access device lines that is not less than the plurality of channels.

22. The apparatus of claim 21 wherein the network switch component is a segment and reassembly (SAR) device.

23. The apparatus of claim 21 wherein the network switch component is an ATM adaptation layer type 2 (AAL2) device.

24. The apparatus of claim 21 wherein:

the plurality of network terminals is greater than the plurality of integrated access device lines; and the plurality of integrated access device lines is greater than the plurality of channels of the network switch component.

25. The apparatus of claim 21 wherein:

the plurality of network terminals is greater than the plurality of integrated access device lines; and the plurality of integrated access device lines is equal to the plurality of channels of the network switch component.

26. The apparatus of claim 21 wherein:

the plurality of network terminals is equal to the plurality of integrated access device lines; and the plurality of integrated access device lines is greater than the plurality of channels of the network switch component.

27. The apparatus of claim 21 further comprising means for providing information to any of the plurality of network terminals for which network access is blocked, including information indicating that network access is blocked, wherein the information is broadcasted by at least the network switch component.

28. The apparatus of claim 27 wherein the information includes a reorder tone.

29. The apparatus of claim 27 wherein the information includes a busy signal.

30. The apparatus of claim 21 further comprising means for providing information to any of the plurality of network terminals for which network access is blocked, including information indicating that network access is blocked, wherein the information is not broadcasted by the network switch component.

31. The apparatus of claim 21 further comprising means for providing information to any of the plurality of network terminals for which network access is blocked, including information indicating that network access is blocked, wherein:

the plurality of channels of the network switch component includes a plurality of revenue traffic channels and a plurality of reserved channels not otherwise employed for revenue traffic;

the information is broadcasted by the plurality of reserved channels; and the plurality of integrated access device lines is not less than the plurality of revenue traffic channels.

32. The apparatus of claim 21 further comprising means for providing information to any of the plurality of network terminals for which network access is blocked, including information indicating that network access is blocked, wherein:

the plurality of channels of the network switch component includes a plurality of revenue traffic channels and a plurality of reserved channels not otherwise employed for revenue traffic;

the information is broadcasted by the plurality of reserved channels and is not broadcasted by any of the plurality of integrated access devices; and the plurality of integrated access device lines is not less than the plurality of revenue traffic channels.

33. The apparatus of claim 21 wherein any one of the plurality of packetized signals simultaneously includes voice data and non-voice data.

34. An apparatus, comprising:

means for switching packetized signals multiplexed from ones of a plurality of network terminals onto ones of a plurality of revenue traffic channels, wherein:

the plurality of network terminals is greater than the plurality of revenue traffic channels;

the packetized signals are multiplexed from ones of the plurality of network terminals onto ones of a plurality of integrated access devices lines by ones of a plurality of integrated access devices;

the plurality of integrated access devices are connected to the plurality of revenue traffic channels by the plurality of integrated access device lines; and the plurality of integrated access device lines is not less than the plurality of revenue traffic channels.

35. The apparatus of claim 34 wherein the switching means includes a segment and reassembly (SAR) device.

36. The apparatus of claim 34 wherein the switching means includes an ATM adaptation layer type 2 (AAL2) device.

37. The apparatus of claim 34 wherein:

the plurality of network terminals is greater than the plurality of integrated access device lines; and the plurality of integrated access device lines is greater than the plurality of revenue traffic channels.

38. The apparatus of claim 34 wherein:

the plurality of network terminals is greater than the plurality of integrated access device lines; and the plurality of integrated access device lines is equal to the plurality of revenue traffic channels.

39. The apparatus of claim 34 wherein:

the plurality of network terminals is equal to the plurality of integrated access device lines; and the plurality of integrated access device lines is greater than the plurality of revenue traffic channels.

40. The apparatus of claim 34 further comprising means for broadcasting information to any of the plurality of network terminals for which network access is blocked, including information indicating that network access is blocked.

41. The apparatus of claim 40 wherein the information includes a reorder tone.

42. The apparatus of claim 40 wherein the information includes a busy signal.

43. The apparatus of claim 34 further comprising means for broadcasting information to any of the plurality of network terminals for which network access is blocked, including information indicating that network access is blocked, wherein:

the switching means includes a plurality of reserved channels not otherwise employed for revenue traffic; and the information is broadcasted by the plurality of reserved channels.

44. The apparatus of claim 34 wherein the packetized signals include signals simultaneously including voice data and non-voice data.

* * * * *